United States Patent
Wang

(10) Patent No.: US 12,075,286 B2
(45) Date of Patent: Aug. 27, 2024

(54) COMMUNICATION METHOD AND APPARATUS, COMPUTER-READABLE MEDIUM AND ELECTRONIC DEVICE

(71) Applicant: Tencent Technology (Shenzhen) Company Limited, Guangdong (CN)

(72) Inventor: Tao Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 520 days.

(21) Appl. No.: 17/324,734

(22) Filed: May 19, 2021

(65) Prior Publication Data
US 2021/0274389 A1 Sep. 2, 2021

Related U.S. Application Data

(63) Continuation of application No. PCT/CN2020/076623, filed on Feb. 25, 2020.

(30) Foreign Application Priority Data

Apr. 2, 2019 (CN) .......................... 201910261362.9

(51) Int. Cl.
*H04W 28/24* (2009.01)
*H04W 24/08* (2009.01)
(Continued)

(52) U.S. Cl.
CPC .......... *H04W 28/24* (2013.01); *H04W 24/08* (2013.01); *H04W 24/10* (2013.01); *H04W 72/543* (2023.01); *H04L 43/0852* (2013.01)

(58) Field of Classification Search
CPC ............. H04L 41/5009; H04L 43/0852; H04L 43/0858; H04W 24/08; H04W 24/10;
(Continued)

(56) References Cited

U.S. PATENT DOCUMENTS 8,842,629 B2   9/2014   Qin et al.
9,642,034 B2   5/2017   Zhu et al.
(Continued)

FOREIGN PATENT DOCUMENTS

CN   102111819 A   6/2011
CN   102638852 A   8/2012
(Continued)

OTHER PUBLICATIONS

First Office Action for Japanese application No. 2021-540492 dated Jun. 14, 2022, 2p, in Japanese language.
(Continued)

*Primary Examiner* — Mansour Oveissi
(74) *Attorney, Agent, or Firm* — Crowell & Moring LLP

(57) ABSTRACT

Embodiments of this application provide a communication method and apparatus, a computer-readable medium, and an electronic device. The communication method includes: obtaining a total latency tolerance of uplink (UL) transmission and downlink (DL) transmission of a target service; generating a transmission latency indication message for the target service according to the total latency tolerance, the transmission latency indication message including quality of service (QOS) flow indication information of the UL transmission of the target service and QoS flow indication information of the DL transmission of the target service; and configuring the transmission latency indication message for a radio access network (RAN) entity, so as to enable the RAN entity to monitor a transmission latency of the target service according to the transmission latency indication message.

19 Claims, 8 Drawing Sheets

(51) Int. Cl.
*H04W 24/10* (2009.01)
*H04W 72/543* (2023.01)
*H04L 43/0852* (2022.01)

(58) Field of Classification Search
CPC ............. H04W 28/0268; H04W 28/24; H04W 72/543
See application file for complete search history.

(56) References Cited

U.S. PATENT DOCUMENTS

| | | | |
|---|---|---|---|
| 9,936,416 | B2 | 4/2018 | Li et al. |
| 2015/0189539 | A1 | 7/2015 | Li et al. |
| 2015/0281999 | A1 | 10/2015 | Zhu et al. |
| 2016/0182286 | A1 | 6/2016 | Lunden et al. |
| 2019/0174360 | A1 | 6/2019 | Pang et al. |
| 2019/0215729 | A1* | 7/2019 | Oyman ............... H04L 65/1016 |
| 2021/0014725 | A1* | 1/2021 | Sridhar ............... H04N 19/159 |
| 2021/0014739 | A1* | 1/2021 | Xin ..................... H04L 47/2483 |
| 2022/0007235 | A1* | 1/2022 | Liu .................... H04W 28/0236 |
| 2022/0191739 | A1* | 6/2022 | Itoh .................... H04W 28/0268 |

FOREIGN PATENT DOCUMENTS

| | | |
|---|---|---|
| CN | 105722237 A | 6/2016 |
| CN | 107734562 A | 2/2018 |
| CN | 103988543 B | 9/2018 |
| CN | 109245936 A | 1/2019 |
| CN | 110062426 A | 7/2019 |
| EP | 3 110 210 A1 | 12/2016 |
| JP | 2017-513291 | 5/2017 |
| JP | 2017-513291 A | 5/2017 |
| WO | WO 2011/050540 A1 | 5/2011 |
| WO | WO 2014/036704 A1 | 3/2014 |
| WO | WO 2018/130741 A1 | 7/2018 |
| WO | WO 2018/145103 A1 | 8/2018 |
| WO | WO 2018/233451 A1 | 12/2018 |

OTHER PUBLICATIONS

First Office Action for Japanese application No. 2021-540492 dated Jun. 14, 2022, 6p, English translation.
Extended European Search Report for European application No. 207837253 dated May 4, 2022, 9p.
First Examination Report for Indian application No. 202147025680 dated Mar. 23, 2022, 5p.
International Search Report and Written Opinion for priority application No. PCT/CN2020/076623, dated May 29, 2020, 10p, in Chinese language.
English language translation of the Search Report for priority application No. PCT/CN2020/076623, dated May 29, 2020, 2p.
Search Report for Chinese Application No. 201910261362.9, dated Mar. 23, 2021, 15p, in Chinese language.
First Office Action for Chinese Application No. 201910261362.9, dated Mar. 31, 2021, 6p, in Chinese language.
"Fixed Delay QoS Class for Time Synchronization Support of 3GPP Network", Samsung SA WG2 Meeting #129 S2-1810338, dated Oct. 19, 2018, 7p, China.
"Enhancements to 5GS QoS framework for support of deterministic service", SA WG2 Samsung Meeting #130 S2-1900405, dated Jan. 25, 2019, 2p, India.
Concise Explanation of Relevance of the Written Opinion of the International Search Authority for PCT/CN2020/076623, Search Report for Chinese Application No. 201910261362.9, and First Office Action for Chinese Application No. 201910261362.9, 2p.
Written Opinion for Singapore application No. 11202105527V dated Sep. 1, 2022, 8p.
Office Action for corresponding Korean application No. 10-2021-7024835 dated Sep. 30, 2023, 7p.
English language summary of Office Action for corresponding Korean application No. 10-2021-7024835 dated Sep. 30, 2023, 4p.

* cited by examiner

1

COMMUNICATION METHOD AND APPARATUS, COMPUTER-READABLE MEDIUM AND ELECTRONIC DEVICE

RELATED APPLICATION

This application is a continuation of PCT Patent Application No. PCT/CN2020/076623, entitled "COMMUNICATION METHOD AND APPARATUS, COMPUTER-READABLE MEDIUM AND ELECTRONIC DEVICE" and filed with National Intellectual Property Administration, PRC on Feb. 25, 2020, which claims priority to Chinese Patent Application No. 201910261362.9, entitled "COMMUNICATION METHOD AND APPARATUS, COMPUTER-READABLE MEDIUM, AND ELECTRONIC DEVICE" and filed with the National Intellectual Property Administration, PRC on Apr. 2, 2019. The above applications are incorporated herein by reference in their entireties.

TECHNICAL FIELD

This application relates to the field of computer and communication technologies, and specifically, to a process of data communication.

BACKGROUND

To achieve experience of a higher network speed, a greater bandwidth access capability, a lower latency, and highly reliable information exchange, the industry has proposed a network architecture based on a quality of service (QOS) flow. The QoS flow is the smallest granularity that provides QoS differentiation in a protocol data unit (PDU) session, and a QoS flow identifier (QFI) is used for identifying a QoS flow.

In addition, with the development of mobile communication technologies, a variety of new services have been derived, such as a cloud gaming service. The services have a relatively high requirement on a transmission latency as well as a requirement on a total latency of uplink (UL) and downlink (DL) transmission. However, the current QoS mechanism is too limited to meet the QoS requirements of the service layer.

SUMMARY

Embodiments of this disclosure provide a communication method and apparatus, a non-transitory computer-readable medium, and an electronic device, so as to monitor a total latency of UL transmission and DL transmission of a target service at least to some extent, to meet QoS requirements of a service layer.

Other features and advantages of this disclosure become obvious through the following detailed descriptions, or may be partially learned through the practice of this disclosure.

According to an aspect of the embodiments of this disclosure, a communication method is provided, including: obtaining a total latency tolerance of UL transmission and DL transmission of a target service; generating a transmission latency indication message for the target service according to the total latency tolerance, the transmission latency indication message including QoS flow indication information of the UL transmission of the target service and QoS flow indication information of the DL transmission of the target service; and providing the transmission latency indication message to a radio access network (RAN) entity, so as to have the RAN entity configured to monitor a transmission latency of the target service according to the transmission latency indication message.

According to an aspect of the embodiments of this disclosure, a communication method is provided, including: obtaining a transmission latency indication message generated by a core network (CN) entity for a target service according to a total latency tolerance of UL transmission and DL transmission of the target service, the transmission latency indication message including QoS flow indication information of the UL transmission of the target service and QoS flow indication information of the DL transmission of the target service; and monitoring a transmission latency of the target service according to the transmission latency indication message.

According to an aspect of the embodiments of this disclosure, a communication apparatus is provided, including: a receiver, configured to obtain a total latency tolerance of UL transmission and DL transmission of a target service; a processor in communicaiton with the receiver, configured to generate a transmission latency indication message for the target service according to the total latency tolerance, the transmission latency indication message including QoS flow indication information of the UL transmission of the target service and QoS flow indication information of the DL transmission of the target service; and a transmitter in communication with a radio access network (RAN) entity, configured to provided the transmission latency indication message to the RAN entity, so as to have the RAN entity configured to monitor a transmission latency of the target service according to the transmission latency indication message.

In some embodiments of this disclosure, based on the foregoing solutions, the obtaining unit is configured to: receive a notification message transmitted by an application function (AF) entity, and obtain the total latency tolerance according to the notification message; or obtain the total latency tolerance based on information of a contractual agreement with the AF entity; or obtain the total latency tolerance pre-configured by the AF entity.

In some embodiments of this disclosure, based on the foregoing solutions, the generation unit is configured to: generate information for indicating the total latency tolerance according to the total latency tolerance, and allocate QoS flow indication information respectively to the UL transmission and the DL transmission of the target service; and generate the transmission latency indication message according to the information for indicating the total latency tolerance and the QoS flow indication information respectively allocated to the UL transmission and the DL transmission of the target service.

In some embodiments of this disclosure, based on the foregoing solutions, the generation unit is configured to: determine an UL latency tolerance and a DL latency tolerance of the target service according to the total latency tolerance; and generate the QoS flow indication information of the UL transmission according to the UL latency tolerance, and generate the QoS flow indication information of the DL transmission according to the DL latency tolerance.

In some embodiments of this disclosure, based on the foregoing solutions, the generation unit is configured to: divide the total latency tolerance to obtain the UL latency tolerance and the DL latency tolerance of the target service; or receive a division status, notified by an AF entity, of the UL latency tolerance and the DL latency tolerance of the target service, and determine the UL latency tolerance and the DL latency tolerance according to the division status and the total latency tolerance; or receive priorities, notified by the AF entity, of the UL transmission and the DL transmission of the target service, and determine the UL latency tolerance and the DL latency tolerance according to the priorities and the total latency tolerance.

In some embodiments of this disclosure, based on the foregoing solutions, the QoS flow indication information of the UL transmission of the target service includes: one piece of QoS flow indication information corresponding to all UL data of the target service; or QoS flow indication information respectively corresponding to different types of UL data of the target service, the different types of UL data being respectively corresponding to different QoS flow indication information.

In some embodiments of this disclosure, based on the foregoing solutions, the QoS flow indication information of the DL transmission of the target service includes: one piece of QoS flow indication information corresponding to all DL data of the target service; or QoS flow indication information respectively corresponding to different types of DL data of the target service, the different types of DL data being respectively corresponding to different QoS flow indication information.

In some embodiments of this disclosure, based on the foregoing solutions, when the communication method is performed by the CN entity, the obtaining unit is configured to: obtain the total latency tolerance from the AF entity by using a policy control function (PCF) entity; or obtain the total latency tolerance from the AF entity by using a network exposure function (NEF) entity and forward the total latency tolerance to the PCF entity.

According to an aspect of the embodiments of this disclosure, a communication apparatus is provided, including: an obtaining unit, configured to obtain a transmission latency indication message configured by a CN entity for a target service, the transmission latency indication message being generated by the CN entity according to a total latency tolerance of UL transmission and DL transmission of the target service, and the transmission latency indication message including QoS flow indication information of the UL transmission of the target service and QoS flow indication information of the DL transmission of the target service; and a monitoring unit, configured to monitor a transmission latency of the target service according to the transmission latency indication message.

In some embodiments of this disclosure, based on the foregoing solutions, the monitoring unit is configured to: monitor a total latency of the UL transmission and the DL transmission of the target service according to the total latency tolerance when the transmission latency indication message further includes information for indicating the total latency tolerance; monitor an UL transmission latency of the target service according to an UL latency tolerance when the QoS flow indication information of the UL transmission includes the UL latency tolerance; and monitor a DL transmission latency of the target service according to a DL latency tolerance when the QoS flow indication information of the DL transmission includes the DL latency tolerance.

In some embodiments of this disclosure, based on the foregoing solutions, the QoS flow indication information of the UL transmission includes: QoS flow indication information respectively corresponding to different types of UL data of the target service, and the QoS flow indication information of the DL transmission includes QoS flow indication information respectively corresponding to different types of DL data of the target service; and the monitoring unit is configured to: monitor, according to the transmission latency indication message, a transmission latency of UL data of a specified type of the target service and a transmission latency of DL data of a specified type of the target service, the UL data of the specified type and the DL data of the specified type being located in the same PDU session or in different PDU sessions during transmission.

In some embodiments of this disclosure, based on the foregoing solutions, the target service includes a cloud gaming service; and the UL data of the specified type includes game manipulation data, and the DL data of the specified type includes multimedia data obtained by rendering a game scene.

In some embodiments of this disclosure, based on the foregoing solutions, the monitoring unit is configured to: monitor a transmission latency of the target service between user equipment (UE) and the RAN entity according to the transmission latency indication message; and/or monitor a transmission latency of the target service between UE and a user plane function (UPF) entity according to the transmission latency indication message and latency information between the RAN entity and the UPF entity.

According to an aspect of the embodiments of this disclosure, a non-transitory computer-readable medium is provided, storing at least one computer program, the at least one computer program, when executed by at least one processor, implementing the communication method according to the foregoing embodiments.

According to an aspect of the embodiments of this disclosure, an electronic device is provided, including: one or more processors; and a storage apparatus, configured to store one or more programs, the one or more programs, when executed by the one or more processors, causing the one or more processors to implement the communication method according to the foregoing embodiments.

According to an aspect of the embodiments of this disclosure, a computer program product including instructions is provided, the instructions, when run on a computer, causing the computer to perform the communication method in the foregoing embodiments.

In the technical solutions provided in some embodiments of this disclosure, a total latency tolerance of UL transmission and DL transmission of a target service is obtained, a transmission latency indication message for the target service is generated according to the total latency tolerance, and the transmission latency indication message is configured for a RAN entity. In this way, corresponding total latency tolerances can be obtained for different services, so that a total latency tolerance can be dynamically adjusted for a service. In addition, the RAN entity can monitor the transmission latency of the target service according to the transmission latency indication message, which helps to monitor a total latency of the UL transmission and the DL transmission of the target service, thereby meeting QoS requirements of a service layer.

It is to be understood that the above general descriptions and the following detailed descriptions are merely for exemplary and explanatory purposes, and cannot limit this application.

BRIEF DESCRIPTION OF THE DRAWINGS

Accompanying drawings herein are incorporated into the specification and constitute a part of this specification, show embodiments that conform to this disclosure, and are used for describing a principle of this disclosure together with this specification. Apparently, the accompanying drawings described below are merely some embodiments of this disclosure, and a person of ordinary skill in the art may further obtain other accompanying drawings according to the accompanying drawings without creative efforts. In the accompanying drawings.

DESCRIPTION OF EMBODIMENTS

At present, the exemplary implementations are described comprehensively with reference to the accompanying drawings. However, the examples of implementations may be implemented in a plurality of forms, and it is not to be understood as being limited to the examples described herein. Conversely, the implementations are provided to make this disclosure more comprehensive and complete, and comprehensively convey the idea of the examples of the implementations to a person skilled in the art.

In addition, the described features, structures or characteristics may be combined in one or more embodiments in any appropriate manner. In the following descriptions, a lot of specific details are provided to give a comprehensive understanding of the embodiments of this disclosure. However, a person of ordinary skill in the art is to be aware that, the technical solutions in this disclosure may be implemented without one or more of the particular details, or another method, unit, apparatus, or step may be used. In other cases, well-known methods, apparatuses, implementations, or operations are not shown or described in detail, in order not to obscure the aspects of this disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

Figure 1:
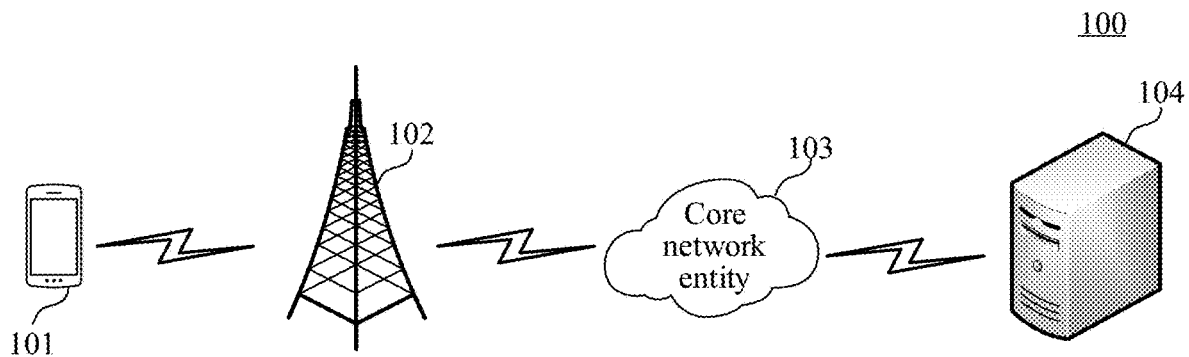
FIG. 1 is a schematic diagram of an exemplary system architecture to which a technical solution according to an embodiment of this disclosure is applicable.

FIG. 1 is a schematic diagram of an exemplary system architecture to which a technical solution according to an embodiment of this disclosure is applicable.

As shown in FIG. 1, a system architecture 100 may include user equipment (UE) 101 (the UE 101 may be a smartphone shown in FIG. 1, or may be a tablet computer, a portable computer, a desktop computer, or the like), a base station 102, a core network (CN) entity 103, and an application function (AF) entity 104.

It is to be understood that FIG. 1 shows merely illustrative quantities of UEs 101, base stations 102, CN entities 103, and AF entities 104. There may be any quantities of UEs, base stations, CN entities, and AF entities according to an actual requirement.

In an embodiment of this disclosure, the CN entity 103 may obtain a total latency tolerance, configured by the AF entity 104, of UL transmission and DL transmission of a target service. For example, the CN entity 103 may obtain the total latency tolerance by receiving a notification message transmitted by the AF entity 104. Alternatively, the CN entity 103 may obtain the total latency tolerance based on information of a contractual agreement with the AF entity 104. Alternatively, the CN entity 103 obtains the total latency tolerance pre-configured by the AF entity 104.

In an embodiment of this disclosure, after obtaining the total latency tolerance of the UL transmission and the DL transmission of the target service, the CN entity 103 may generate a transmission latency indication message for the target service according to the total latency tolerance, the transmission latency indication message including QoS flow indication information of the UL transmission of the target service and QoS flow indication information of the DL transmission of the target service, and then provide the transmission latency indication message for the base station 102, so as to configure the base station 102 to monitor a transmission latency of the target service according to the transmission latency indication message.

In an embodiment of this disclosure, the base station 102 may monitor a transmission latency of the target service between the UE 101 and the base station 102 according to the transmission latency indication message; it can monitor a transmission latency of the target service between the UE 101 and a user plane function (UPF) entity according to the transmission latency indication message and latency information between the base station 102 and the UPF The implementation details of the technical solutions in the embodiments of this disclosure are described below in detail.

Figure 2:
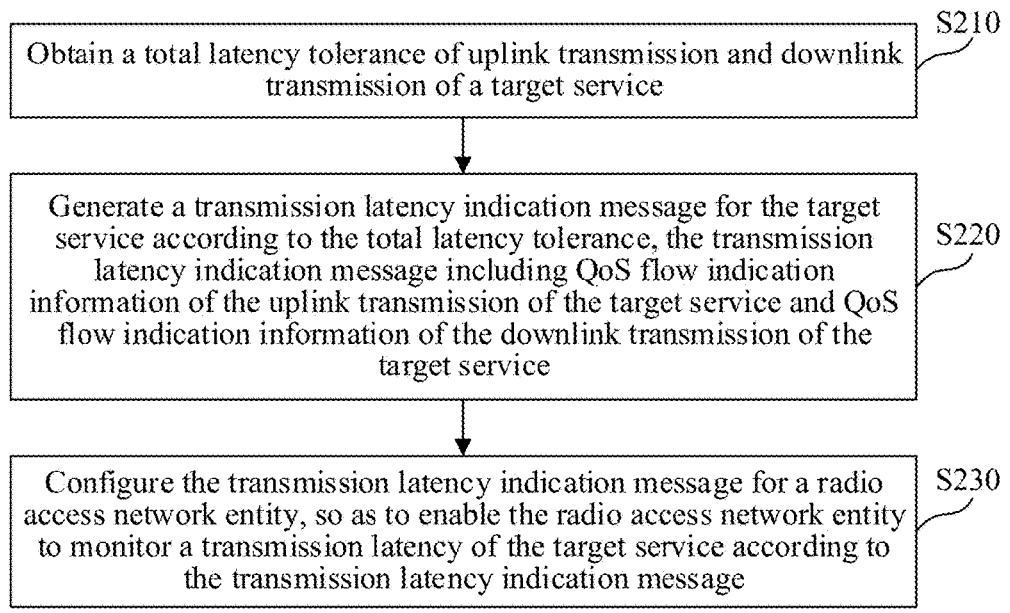
FIG. 2 is a flowchart of a communication method according to an embodiment of this disclosure.

FIG. 2 is a flowchart of a communication method according to an embodiment of this disclosure. The communication method may be performed by the CN entity 103 in FIG. 1. Referring to FIG. 2, the communication method includes at least S210 to S230. A detailed description is as follows:

S210: Obtain a total latency tolerance of UL transmission and DL transmission of a target service.

In an embodiment of this disclosure, the total latency tolerance of the UL transmission and the DL transmission of the target service is obtained, so that total latency tolerances corresponding to different services can be obtained for the services. A latency tolerance can be dynamically adjusted for a service. The target service may be a service that has a requirement on a total latency tolerance of UL transmission and DL transmission, for example, a cloud gaming service. The cloud gaming service is a manner of gaming based on cloud computing. In an operating mode of cloud gaming, UE needs to send game manipulation data (such as sensor data on the UE, action data detected by the UE, or the like) to a cloud end. The cloud end performs a rendering function according to the game manipulation data sent by the UE and then transmits rendered multimedia data (including a game screen, sound data, or the like) to the UE via the network. The advantage of cloud gaming is that the UE does not need to perform complex rendering or computing, which reduces a hardware requirement on the UE. However, cloud gaming requires a network system to provide high-reliability and low-latency transmission for UL game manipulation data, and provide high-bandwidth and low-latency transmission for DL multimedia data, and cloud gaming requires a total latency of UL transmission and DL transmission to be lower than a threshold.

In an embodiment of this disclosure, the CN entity may receive a notification message transmitted by an AF entity, and then obtain the total latency tolerance of the UL transmission and the DL transmission of the target service according to the notification message.

In an embodiment of this disclosure, the CN entity may obtain the total latency tolerance of the UL transmission and the DL transmission based on information of a contractual agreement with the AF entity. The information of the contractual agreement may be a service-level agreement (SLA).

In an embodiment of this disclosure, the CN entity may obtain the total latency of the UL transmission and the DL transmission tolerance that is pre-configured by the AF entity.

In an embodiment of this disclosure, the CN entity may include a policy control function (PCF) entity. The PCF entity may obtain the total latency tolerance of the UL transmission and the DL transmission from the AF entity. This case applies to a scenario where the PCF entity and the AF entity are in the same trusted domain.

In an embodiment of this disclosure, the CN entity may include a PCF entity and a network exposure function (NEF) entity. The NEF entity may obtain the total latency tolerance of the UL transmission and the DL transmission from the AF entity and forward the total latency tolerance to the PCF entity. This case applies to a scenario where the PCF entity and the AF entity are in different trusted domains.

Still referring to FIG. 2, S220: Generate a transmission latency indication message for the target service according to the total latency tolerance, the transmission latency indication message including QoS flow indication information of the UL transmission of the target service and QoS flow indication information of the DL transmission of the target service.

In an embodiment of this disclosure, the QoS flow indication information may be a QoS Flow ID (QFI). If applied to a 5G system, the QoS flow indication information may be a 5G QoS identifier (5QI).

In an embodiment of this disclosure, the QoS flow indication information of the UL transmission of the target service may include: one piece of QoS flow indication information corresponding to all UL data of the target service. That is, in this embodiment, all UL data of the target service corresponds to one piece of QoS flow indication information. For example, UL data of the cloud gaming service includes game manipulation data and an acknowledgment of multimedia data sent by the cloud end. Then the game manipulation data and the acknowledgment correspond to one piece of QoS flow indication information.

In an embodiment of this disclosure, the QoS flow indication information of the UL transmission of the target service may include: QoS flow indication information respectively corresponding to different types of UL data of the target service, the different types of UL data being respectively corresponding to different QoS flow indication information. That is, in this embodiment, different types of UL data of the target service correspond to different QoS flow indication information. For example, UL data of the cloud gaming service includes game manipulation data and an acknowledgment of multimedia data sent by the cloud end. Then the game manipulation data and the acknowledgment respectively correspond to different QoS flow indication information.

In an embodiment of this disclosure, the QoS flow indication information of the DL transmission of the target service may include: one piece of QoS flow indication information corresponding to all DL data of the target service. That is, in this embodiment, all DL data of the target service corresponds to one piece of QoS flow indication information. For example, DL data of the cloud gaming service includes an acknowledgment of game manipulation data sent by the UE and multimedia data obtained after rendering. Then the acknowledgment and the multimedia data correspond to one piece of QoS flow indication information.

In an embodiment of this disclosure, the QoS flow indication information of the DL transmission of the target service may include: QoS flow indication information respectively corresponding to different types of DL data of the target service, the different types of DL data being respectively corresponding to different QoS flow indication information. That is, in this embodiment, different types of DL data of the target service correspond to different QoS flow indication information. For example, DL data of the cloud gaming service includes an acknowledgment of game manipulation data sent by the UE and multimedia data obtained after rendering. Then the acknowledgment and the multimedia data respectively correspond to different QoS flow indication information.

Figure 3:
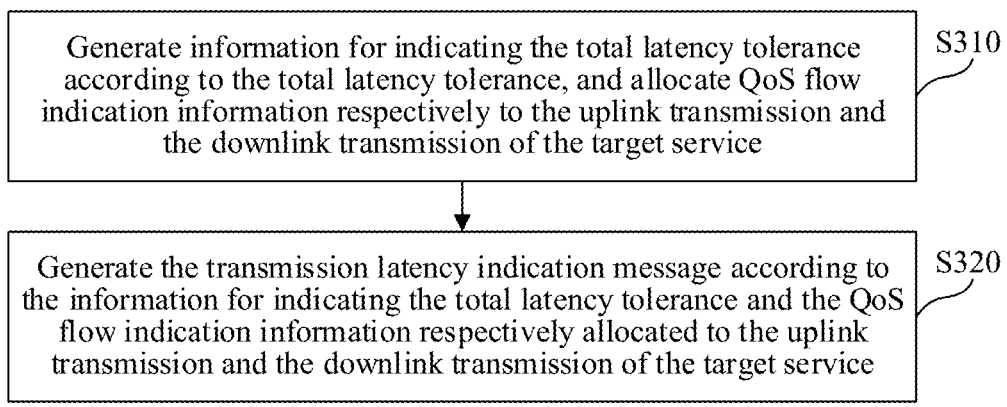
FIG. 3 is a flowchart of generating a transmission latency indication message for a target service according to a total latency tolerance according to an embodiment of this disclosure.

In an embodiment of this disclosure, as shown in FIG. 3, a process of generating a transmission latency indication message for the target service according to the total latency tolerance may include the following S310 and S320:

S310: Generate information for indicating the total latency tolerance according to the total latency tolerance, and allocate QoS flow indication information respectively to the UL transmission and the DL transmission of the target service.

In an embodiment of this disclosure, if the information for indicating the total latency tolerance is generated, the QoS flow indication information allocated to the UL transmission and the DL transmission of the target service respectively may not require an absolute division of the total latency tolerance between the UL and the DL. That is, QoS flows respectively allocated to the UL transmission and the DL transmission of the target service may choose not to clearly indicate a latency tolerance of the UL transmission and a latency tolerance of the DL transmission.

S320: Generate the transmission latency indication message according to the information for indicating the total latency tolerance and the QoS flow indication information respectively allocated to the UL transmission and the DL transmission of the target service.

In an embodiment of this disclosure, if the information for indicating the total latency tolerance of the UL transmission and the DL transmission is generated, and the QoS flow indication information is allocated to the UL transmission and the DL transmission of the target service respectively, the transmission latency indication message may be generated according to the information, and the transmission latency indication message is then sent to a RAN entity.

In the technical solution of the embodiment shown in FIG. 3, the total latency tolerance of the UL transmission and the DL transmission is indicated by using indication information other than the QoS flow indication information.

Figure 4:
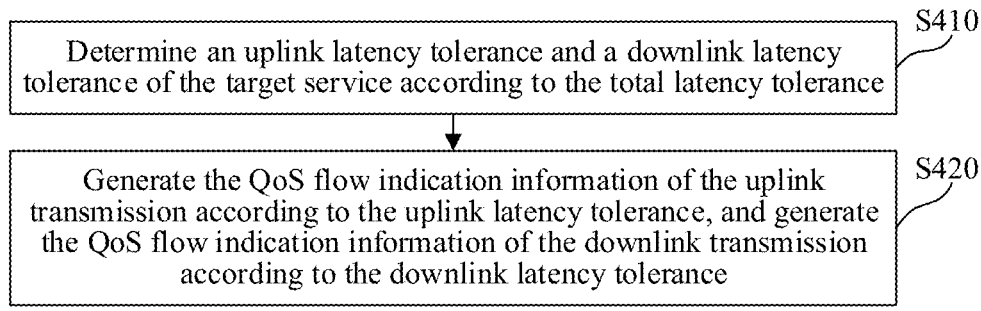
FIG. 4 is a flowchart of generating a transmission latency indication message for a target service according to a total latency tolerance according to an embodiment of this disclosure.

In an embodiment of this disclosure, as shown in FIG. 4, a process of generating a transmission latency indication message for the target service according to the total latency tolerance may include the following S410 and S420:

S410: Determine an UL latency tolerance and a DL latency tolerance of the target service according to the total latency tolerance.

In an embodiment of this disclosure, the CN entity (such as a PCF entity) may receive a division status, provided by an AF entity, of the UL latency tolerance and the DL latency tolerance of the target service. The CN entity determines the UL latency tolerance and the DL latency tolerance according to the division status and the total latency tolerance. That is, in the technical solution in this embodiment, the AF entity may directly notify the CN entity of a division status between the UL latency tolerance and the DL latency tolerance, and then the CN entity may directly determine the UL latency tolerance and the DL latency tolerance according to the division status.

In an embodiment of this disclosure, the CN entity (such as a PCF entity) may receive priorities, provided by the AF entity, of the UL transmission and the DL transmission of the target service, and determine the UL latency tolerance and the DL latency tolerance according to the priorities and the total latency tolerance. That is, in the technical solution in this embodiment, the AF entity does not clearly notify the CN entity of a division status between the UL latency tolerance and the DL latency tolerance, but notifies the CN entity of the priorities of the UL transmission and the DL transmission. Then, the CN entity may divide the total latency tolerance according to the priorities to determine the UL latency tolerance and the DL latency tolerance. For example, if a priority of the UL transmission is higher than a priority of the DL transmission, the UL latency tolerance may be less than the DL latency tolerance, and then the total latency tolerance may be divided accordingly.

In an embodiment of this disclosure, the CN entity (such as a PCF entity) may directly divide the total latency tolerance to obtain the UL latency tolerance and the DL latency tolerance of the target service. That is, in this embodiment, the CN entity may alternatively independently determine the UL latency tolerance and the DL latency tolerance according to the total latency tolerance. For example, the CN entity may determine latency requirements of different services on UL transmission and DL transmission according to historical data, and then independently determine a division status of an UL latency tolerance and a DL latency tolerance for a service accordingly.

S420: Generate the QoS flow indication information of the UL transmission according to the UL latency tolerance, and generate the QoS flow indication information of the DL transmission according to the DL latency tolerance.

In the technical solution of the embodiment shown in FIG. 4, the UL latency tolerance and the DL latency tolerance can be directly indicated by using the QoS flow indication information. Therefore, there is no need to additionally indicate the total latency tolerance of the UL transmission and the DL transmission.

Still referring to FIG. 2, S230: Provide the transmission latency indication message to a RAN entity, so as to have the RAN entity configured to monitor a transmission latency of the target service according to the transmission latency indication message.

In an embodiment of this disclosure, the RAN entity may be a base station. The RAN entity monitors a transmission latency of the target service according to the transmission latency indication message, that is, it monitors an UL transmission latency and a DL transmission latency of the target service to ensure that the UL transmission latency and the DL transmission latency do not exceed the total latency tolerance. The following embodiment illustrates the technical solutions of this disclosure from the perspective of a RAN entity.

Figure 5:
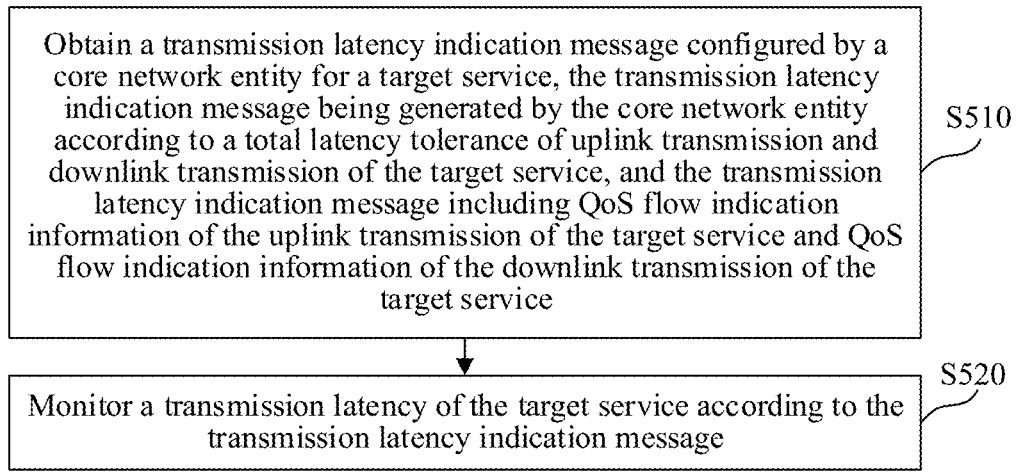
FIG. 5 is a flowchart of a communication method according to an embodiment of this disclosure.

FIG. 5 is a flowchart of a communication method according to an embodiment of this disclosure. The communication method may be performed by a RAN entity, and the RAN entity may be the base station 102 shown in FIG. 1. Referring to FIG. 5, the communication method includes at least S510 and S520. A detailed description is as follows:

S510: Obtain a transmission latency indication message configured by a CN entity for a target service, the transmission latency indication message being generated by the CN entity according to a total latency tolerance of UL transmission and DL transmission of the target service, and the transmission latency indication message including QoS flow indication information of the UL transmission of the target service and QoS flow indication information of the DL transmission of the target service.

In an embodiment of this disclosure, for a process in which the CN entity generates the transmission latency indication message according to the total latency tolerance of the UL transmission and the DL transmission of the target service, reference may be made to the technical solutions of the foregoing embodiments.

S520: Monitor a transmission latency of the target service according to the transmission latency indication message.

In an embodiment of this disclosure, in addition to the QoS flow indication information of the UL transmission of the target service and the QoS flow indication information of the DL transmission of the target service, the transmission latency indication message further includes information for indicating the total latency tolerance of the UL transmission and the DL transmission, and then a total latency of the UL transmission and the DL transmission of the target service may be monitored according to the total latency tolerance.

In an embodiment of this disclosure, an UL transmission latency of the target service may be monitored according to an UL latency tolerance when the QoS flow indication information of the UL transmission includes the UL latency tolerance.

In an embodiment of this disclosure, a DL transmission latency of the target service may be monitored according to a DL latency tolerance when the QoS flow indication information of the DL transmission includes the DL latency tolerance.

In an embodiment of this disclosure, if the RAN entity detects either that the total latency of the UL transmission and the DL transmission of the target service exceeds the total latency tolerance, or detects that the UL transmission latency of the target service exceeds the UL latency tolerance, or detects that the DL transmission latency of the target service exceeds the DL latency tolerance, a notification message may be sent to the CN entity or the AF entity, so that the CN entity or the AF entity can take corresponding measures.

In an embodiment of this disclosure, monitoring, by the RAN entity, a transmission latency of the target service according to the transmission latency indication message may include monitoring a transmission latency of the target service between UE and the RAN entity according to the transmission latency indication message.

In an embodiment of this disclosure, monitoring, by the RAN entity, a transmission latency of the target service according to the transmission latency indication message may include monitoring a transmission latency of the target service between UE and a UPF entity according to the transmission latency indication message and latency information between the RAN entity and the UPF entity. In this embodiment, because a latency between the RAN entity and the UPF entity is generally fixed, the RAN entity may monitor the transmission latency of the target service between the UE and the UPF entity according to the transmission latency of the target service between the UE and the RAN entity and the latency between the RAN entity and the UPF entity.

In an embodiment of this disclosure, if the QoS flow indication information of the UL transmission includes QoS flow indication information respectively corresponding to different types of UL data of the target service, and the QoS flow indication information of the DL transmission includes QoS flow indication information respectively corresponding to different types of DL data of the target service, a transmission latency of UL data of a specified type of the target service and a transmission latency of DL data of a specified type of the target service may be monitored according to the transmission latency indication message. The UL data of the specified type and the DL data of the specified type being located in the same PDU session or in different PDU sessions during transmission.

For example, UL data of a cloud gaming service includes game manipulation data and an acknowledgment (referred to as a first acknowledgment, for the sake of distinction) of multimedia data sent by a cloud end, and DL data includes an acknowledgment (referred to as a second acknowledgment, for the sake of distinction) of game manipulation data sent by UE and multimedia data obtained after rendering. Then the game manipulation data, the first acknowledgment, the second acknowledgment, and the multimedia data respectively correspond to different QoS flow indication information. In this case, as the acknowledgment in the cloud gaming service is insignificant, it is possible to monitor only a transmission latency of the game manipulation data and a transmission latency of the multimedia data in the cloud gaming service. In addition, the game manipulation data and the second acknowledgment may be in one PDU session, and the multimedia data and the first acknowledgment may be in another PDU session; alternatively, the game manipulation data, the first acknowledgment, the second acknowledgment, and the multimedia data may be in one PDU session.

According to the technical solutions of the foregoing embodiments of this disclosure, the total latency of the UL transmission and the DL transmission of the target service can be monitored, thereby meeting QoS requirements of a service layer.

The following describes the implementation details of the technical solutions of the embodiments of this disclosure by using an example in which the target service is the cloud gaming service.

Figure 6:
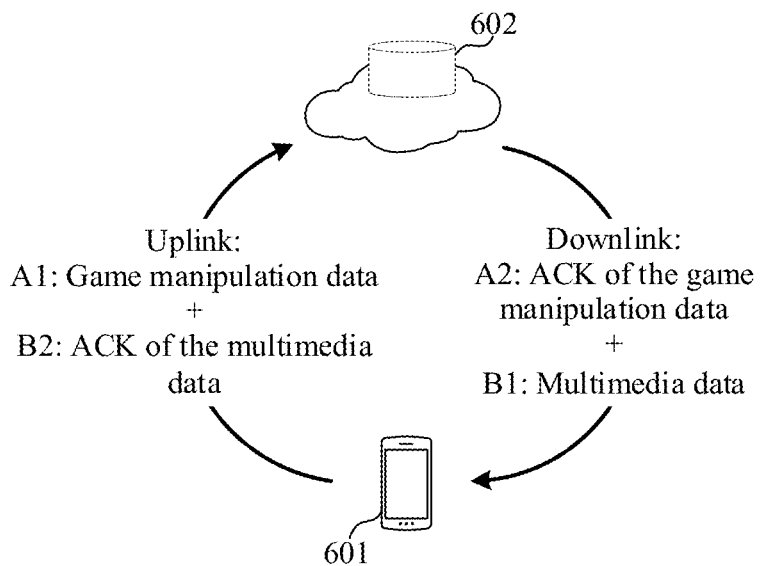
FIG. 6 is a schematic diagram of a scenario of a cloud gaming service according to an embodiment of this disclosure.

In an embodiment of this disclosure, as shown in FIG. 6, in a scenario of a cloud gaming service, a cloud gaming application (APP) runs on UE 601, and an AF entity 602 may be a cloud rendering server, configured to perform rendering according to game manipulation data sent by the UE 601 to obtain multimedia data. UL data sent by the UE 601 includes A1 and B2, and DL data sent by the AF entity 602 includes A2 and B1. A1 represents game manipulation data, such as sensor data on the UE 601 and action data detected by the UE 601. B2 represents an ACK (acknowledgment) of multimedia data. A2 represents an ACK of the game manipulation data. B1 represents the multimedia data, such as a game screen and sound data.

The application scenario shown in FIG. 6 is a non-flow-splitting application scenario, that is, all UL data (including A1 and B2) corresponds to one QoS flow, and all DL data (including A2 and B1) corresponds to one QoS flow.

Figure 7:
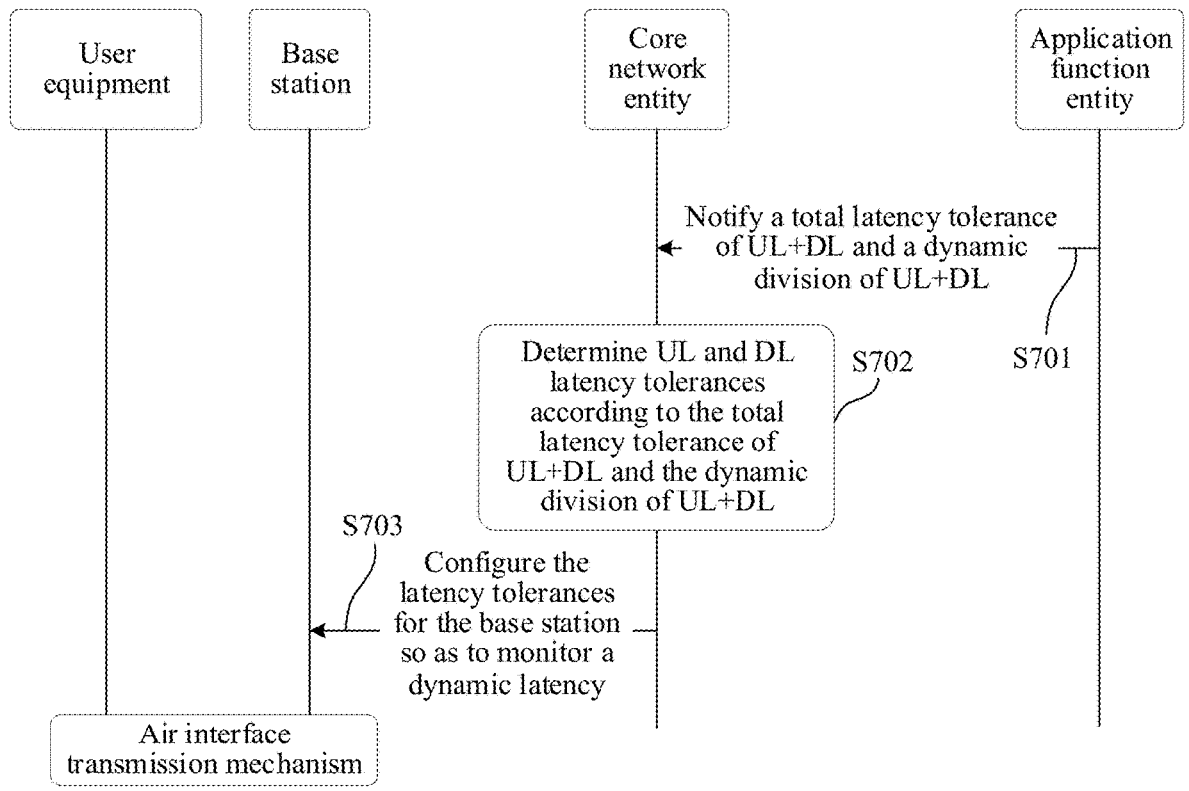
FIG. 7 is a schematic diagram of an interaction process between an AF entity, a CN entity, and a RAN entity according to an embodiment of this disclosure.

In the application scenario shown in FIG. 6, an interaction process between an AF entity, a CN entity, and a RAN entity (in this embodiment, description is made by using an example in which the RAN entity is a base station) is shown in FIG. 7, which may include the following steps:

S701: The AF entity notifies the CN entity of a total latency tolerance of UL plus DL transmission and a dynamic division of UL plus DL transmission.

In an embodiment of this disclosure, the AF entity may notify the CN entity of the total latency tolerance of UL plus DL transmission and the dynamic division of UL plus DL transmission based on SLA interaction. Alternatively, a static configuration may be performed for the CN entity instead of notifying every time. Certainly, the AF entity may alternatively perform a dynamic configuration for the CN entity.

Figure 8:
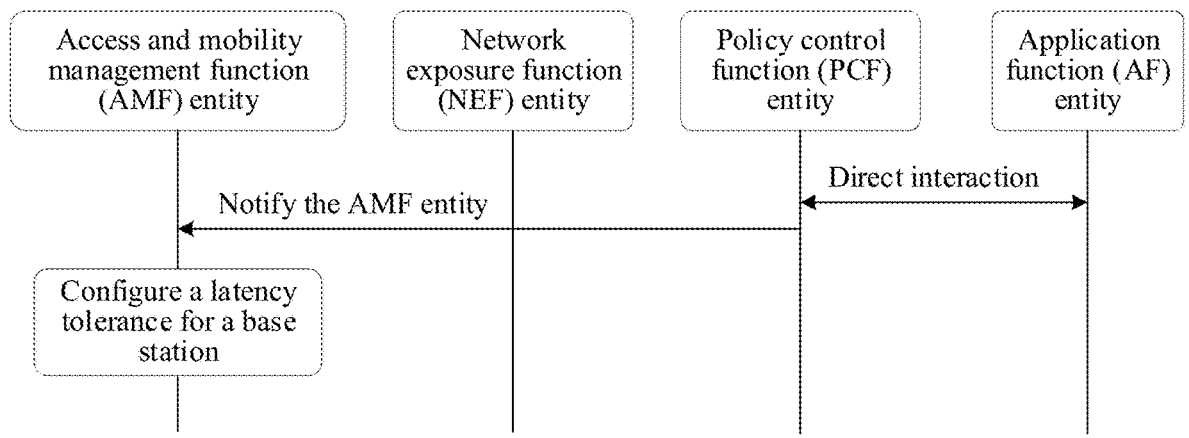
FIG. 8 is a schematic diagram of an interaction process between an AF entity and a CN entity according to an embodiment of this disclosure.

In an embodiment of this disclosure, as shown in FIG. 8, the AF entity and the CN entity may have the following interaction: The AF entity directly interacts with a PCF entity, then the PCF entity notifies an access and mobility management function (AMF) entity of a determined latency tolerance, and the AMF entity configures the latency tolerance for the base station. The technical solution of this embodiment is applicable to an application scenario where the AF entity and the PCF entity are in the same trusted domain, such as a scenario where a network operator itself deploys the AF entity.

Figure 9:
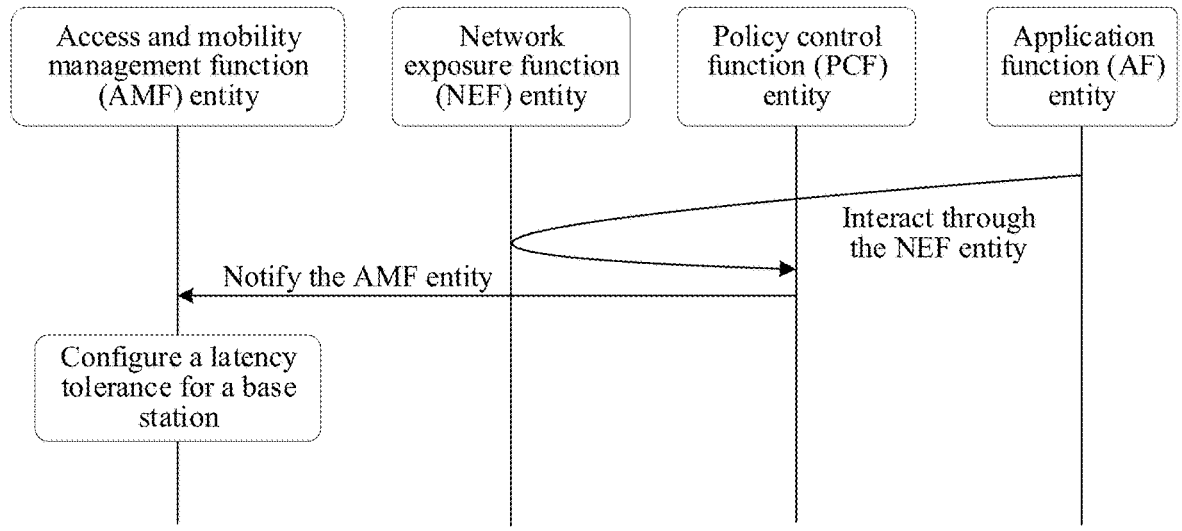
FIG. 9 is a schematic diagram of another interaction process between an AF entity and a CN entity according to an embodiment of this disclosure.

In an embodiment of this disclosure, as shown in FIG. 9, the AF entity and the CN entity may have the following interaction: The AF entity interacts with a PCF entity by using a NEF entity, then the PCF entity notifies an AMF entity of a determined latency tolerance, and the AMF entity configures the latency tolerance for the base station. The technical solution of this embodiment is applicable to an application scenario where the AF entity and the PCF entity are in different trusted domains, such as a scenario where a third party deploys the AF entity.

In an embodiment of this disclosure, the AF entity can further adjust a bitrate for sending the multimedia data to the UE according to a QoS monitoring result, a predicted network condition, and a network resource condition that are provided by a network system (such as a 5G system). When the QoS monitoring result is good, the predicted network condition is good, or network resources are sufficient, the bitrate for sending the multimedia data to the UE can be increased so as to improve the definition of a cloud gaming screen displayed on the UE without compromising fluency. When the QoS monitoring result is poor, the predicted network condition is poor, or network resources are insufficient, the bitrate for sending the multimedia data to the UE is decreased so as to improve fluency of a cloud gaming screen displayed on the UE.

S702: The CN entity determines UL and DL latency tolerances according to the total latency tolerance of UL and DL transmission and the dynamic division of UL and DL transmission.

In an embodiment of this disclosure, because the AF entity has notified the total latency tolerance of UL and DL transmission and the dynamic division of UL and DL transmission, the CN entity can determine the UL and DL latency tolerances accordingly, and then allocate corresponding 5QI values for UL data and DL data according to the UL and DL latency tolerances. In this case, QoS flows allocated respectively for the UL data and the DL data can indicate a latency tolerance of UL transmission and a latency tolerance of DL transmission.

S703: The CN entity configures the latency tolerances for the base station so as to enable the base station to monitor a dynamic latency.

In an embodiment of this disclosure, the CN entity may configure, for the base station, the 5QI values respectively allocated for the UL data and the DL data. During UL and DL scheduling, the base station may monitor whether an UL transmission latency exceeds the latency tolerance of the UL transmission, and monitor whether a DL transmission latency exceeds the latency tolerance of the DL transmission. If either the UL transmission latency exceeds the latency tolerance of the UL transmission, or the DL transmission latency exceeds the latency tolerance of the DL transmission, the base station may notify the CN entity and the AF entity.

Figure 10:
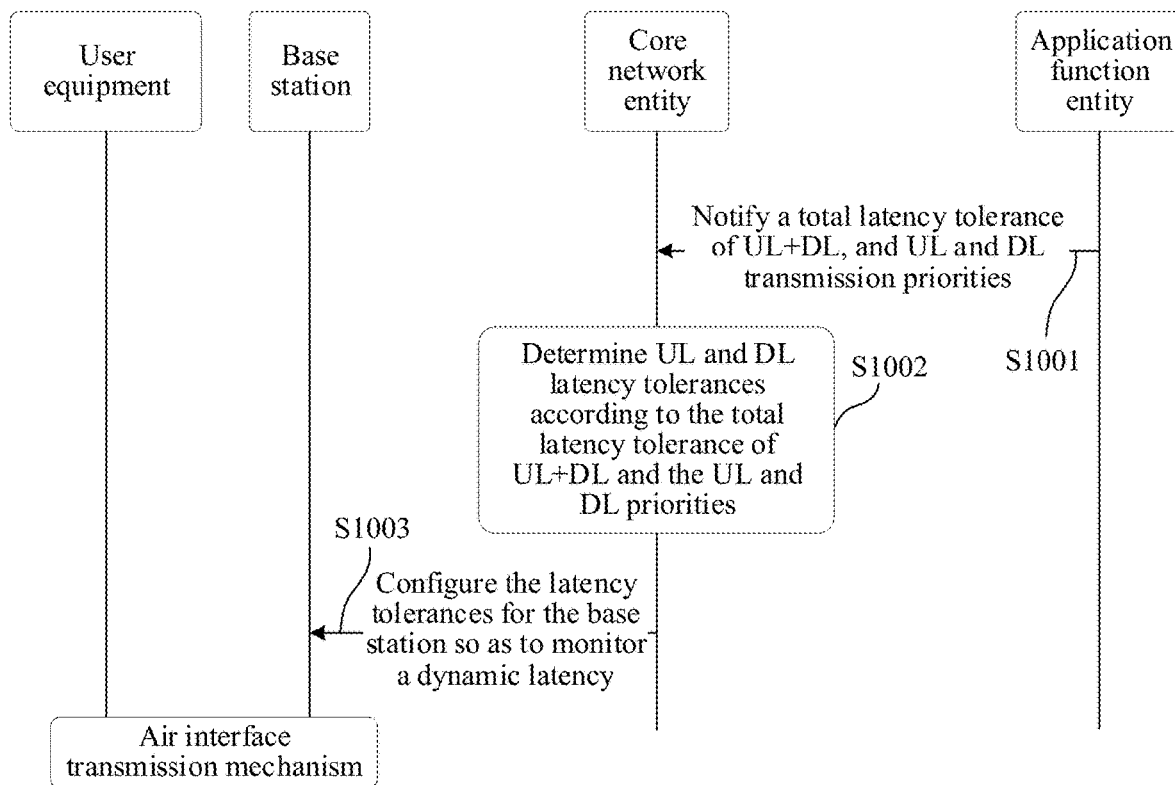
FIG. 10 is a schematic diagram of another interaction process between an AF entity, a CN entity, and a RAN entity according to an embodiment of this disclosure.

In the application scenario shown in FIG. 6, another interaction process between an AF entity, a CN entity, and a RAN entity is shown in FIG. 10, which may include the following steps:

S1001: The AF entity notifies the CN entity of a total latency tolerance of UL and DL transmission, and UL and DL transmission priorities.

The interaction manner between the AF entity and the CN entity in this embodiment is the same as that in the foregoing embodiment, and is not repeated herein.

S1002: The CN entity determines UL and DL latency tolerances according to the total latency tolerance of UL and DL transmission and the UL and DL transmission priorities.

In an embodiment of this disclosure, because the AF entity notifies the CN entity of the total latency tolerance of UL and DL transmission and the UL and DL transmission priorities, the CN entity may determine the UL and DL latency tolerances accordingly. For example, if a priority of UL transmission is higher than a priority of DL transmission, the UL latency tolerance may be less than the DL latency tolerance, and then the total latency tolerance can be divided accordingly. Then the CN entity allocates corresponding 5QI values for UL data and DL data according to the UL and DL latency tolerances. In this case, QoS flows allocated respectively for the UL data and the DL data can indicate the latency tolerance of the UL transmission and the latency tolerance of the DL transmission.

S1003: The CN entity provides the latency tolerances for the base station so as to have the base station configured to monitor a dynamic latency.

In an embodiment of this disclosure, the CN entity may configure, for the base station, the 5QI values respectively allocated for the UL data and the DL data. During UL and DL scheduling, the base station may monitor whether an UL transmission latency exceeds the latency tolerance of the UL transmission, and monitor whether a DL transmission latency exceeds the latency tolerance of the DL transmission. If either the UL transmission latency exceeds the latency tolerance of the UL transmission, or the DL transmission latency exceeds the latency tolerance of the DL transmission, the base station may notify the CN entity and the AF entity.

Figure 11:
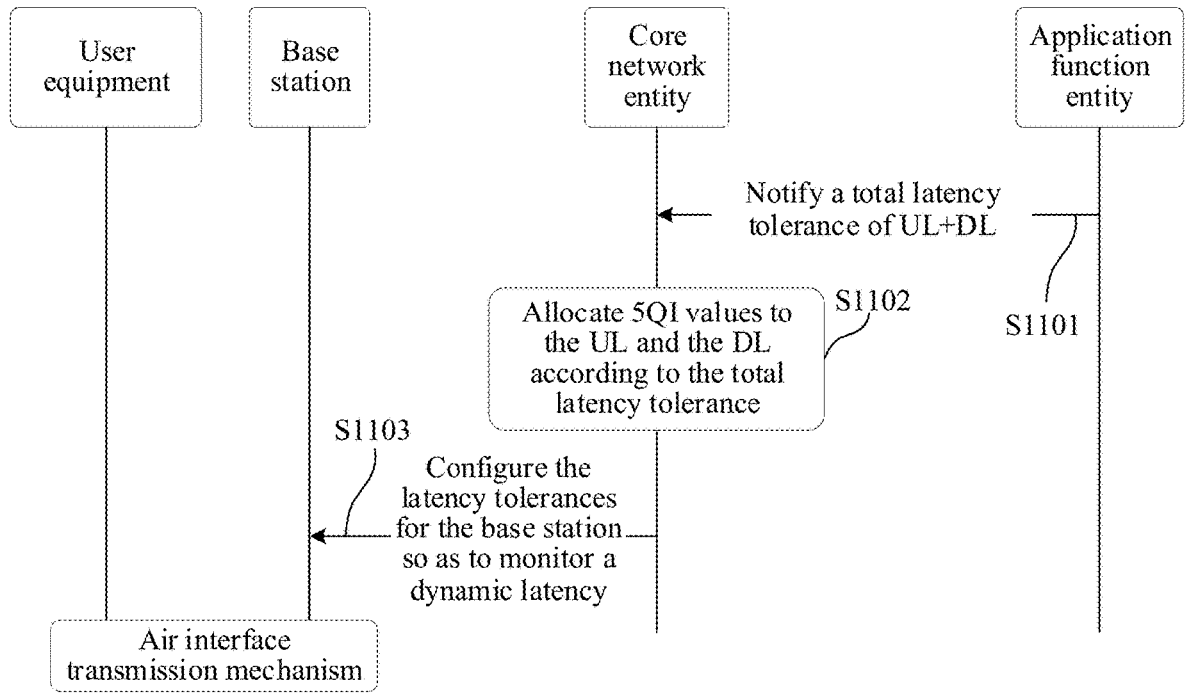
FIG. 11 is a schematic diagram of another interaction process between an AF entity, a CN entity, and a RAN entity according to an embodiment of this disclosure.

In the application scenario shown in FIG. 6, another interaction process between an AF entity, a CN entity, and a RAN entity is shown in FIG. 11, which may include the following steps:

S1101: The AF entity notifies the CN entity of a total latency tolerance of UL and DL transmission.

The interaction manner between the AF entity and the CN entity in this embodiment is the same as the foregoing embodiment, and is not repeated herein.

S1102: The CN entity allocates 5QI values to the UL and the DL according to the total latency tolerance of UL and DL transmission.

In an embodiment of this disclosure, when allocating the 5QI values to the UL and the DL according to the total latency tolerance of UL and DL transmission, the CN entity may first determine UL and DL latency tolerances. For example, the CN entity may determine a latency requirement of the cloud gaming service on UL transmission and DL transmission based on historical data, then independently determine a division status of an UL latency tolerance and a DL latency tolerance for the cloud gaming service accordingly, divide the total latency tolerance to obtain the UL and DL latency tolerances, and allocate the 5QI values to the UL and the DL accordingly. In this case, QoS flows allocated respectively for UL data and DL data can indicate the latency tolerance of the UL transmission and the latency tolerance of the DL transmission.

In an embodiment of this disclosure, when the CN entity allocates the 5QI values to the UL and the DL according to the total latency tolerance of UL and DL transmission, an absolute division of the latency tolerance between the UL and the DL may not be required. In this case, the CN entity may introduce a new indication message to indicate the total latency tolerance of UL and DL transmission to the base station.

S1103: The CN entity configures the latency tolerances for the base station so as to enable the base station to monitor a dynamic latency.

In an embodiment of this disclosure, if QoS flows allocated by the CN entity respectively for the UL data and the DL data can indicate the latency tolerance of the UL transmission and the latency tolerance of the DL transmission, the CN entity may configure, for the base station, the 5QI values respectively allocated for the UL data and the DL data. Then during UL and DL scheduling, the base station may monitor whether an UL transmission latency exceeds the latency tolerance of the UL transmission, and monitor whether a DL transmission latency exceeds the latency tolerance of the DL transmission. If the UL transmission latency exceeds the latency tolerance of the UL transmission, or the DL transmission latency exceeds the latency tolerance of the DL transmission, the base station may notify the CN entity and the AF entity.

In an embodiment of this disclosure, if QoS flows allocated by the CN entity respectively for the UL data and the DL data does not require an absolute division of the latency tolerance between the UL and the DL, and the CN entity introduces a new indication message to indicate the total latency tolerance of UL and DL transmission to the base station, during UL and DL scheduling, the base station may monitor whether a total latency of the UL transmission and the DL transmission exceeds the total latency tolerance. If the total latency of the UL transmission and the DL transmission exceeds the total latency tolerance, the base station may notify the CN entity and the AF entity.

Figure 12:
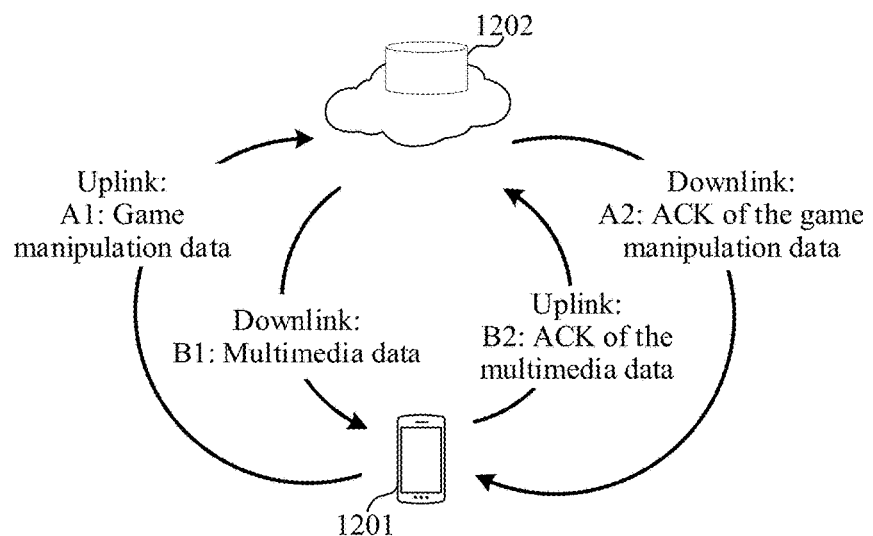
FIG. 12 is a schematic diagram of a scenario of a cloud gaming service according to another embodiment of this disclosure.

In another embodiment of this disclosure, as shown in FIG. 12, in a scenario of a cloud gaming service, a cloud gaming APP runs on UE 1201, and an AF entity 1202 may be a cloud rendering server, configured to perform rendering according to game manipulation data sent by the UE 1201 to obtain multimedia data. UL data sent by the UE 1201 includes A1 and B2, and DL data sent by the AF entity 1202 includes A2 and B1. A1 represents game manipulation data, such as sensor data on the UE 1201 and action data detected by the UE 1201. B2 represents an ACK (acknowledgment) of multimedia data. A2 represents an ACK of the game manipulation data. B1 represents the multimedia data, such as a game screen and sound data.

The application scenario shown in FIG. 12 is a flow-splitting application scenario, that is, the UL data A1 and B2 correspond to different QoS flows, and the DL data A2 and B1 also correspond to different QoS flows. A1 and A2 may be in one PDU session, and B1 and B2 may be in one PDU session; alternatively, A1, A2, B1, and B2 may be in one PDU session.

In the application scenario shown in FIG. 12, an interaction process between an AF entity, a CN entity, and a RAN entity is similar to the examples shown in FIG. 7 to FIG. 11 in the foregoing embodiments, and differences are specifically as follows:

(1) The CN entity needs to allocate QoS flows for different UL data (A1 and B2) and different DL data (A2 and B1) respectively when allocating QoS flows for UL data and DL data respectively.

(2) When the base station performs UL and DL scheduling, if the QoS flows can indicate a latency tolerance of UL transmission and a latency tolerance of DL transmission, the base station may monitor only whether an UL transmission latency of A1 (the game manipulation data) exceeds a corresponding latency tolerance of the UL transmission and whether a DL transmission latency of B1 (the multimedia data) exceeds a corresponding latency tolerance of the DL transmission. If the UL transmission latency of A1 exceeds the corresponding latency tolerance of the UL transmission, or the DL transmission latency of B1 exceeds the corresponding latency tolerance of the DL transmission, the base station may notify the CN entity and the AF entity.

(3) When the base station performs UL and DL scheduling, if QoS flows allocated by the CN entity for the UL data and the DL data respectively do not require an absolute division of the latency tolerance between the UL and the DL, and the CN entity introduces a new indication message to indicate a total latency tolerance of UL and DL transmission to the base station, the base station may monitor whether a sum of a UL transmission latency of A1 (the game manipulation data) and a DL transmission latency of B1 (the multimedia data) exceeds the total latency tolerance. If the sum of the UL transmission latency of A1 and the DL transmission latency of B1 exceeds the total latency tolerance, the base station may notify the CN entity and the AF entity.

It can be learned that in the flow-splitting application scenario shown in FIG. 12, the technical solution of this embodiment of this application can ensure a total latency tolerance of some data flows in the UL transmission and some data flows in the DL transmission, which effectively improves the flexibility of a QoS flow mechanism.

According to the technical solutions of the embodiments shown in FIG. 6 to FIG. 12, not only the total latency of the UL transmission and the DL transmission of the cloud gaming service is monitored, but also the dynamic latency tolerances of the UL and the DL are implemented, which effectively meets QoS requirements of a service layer. The technical solutions of the foregoing embodiments of this disclosure are also applicable to other services that need to ensure a total latency of UL transmission and DL transmission.

The following describes apparatus embodiments of this disclosure, and the apparatus embodiments may be used for performing the communication methods in the foregoing embodiments of this disclosure. For details not disclosed in the apparatus embodiments of this disclosure, reference may be made to the foregoing communication method embodiments of this disclosure.

Figure 13:
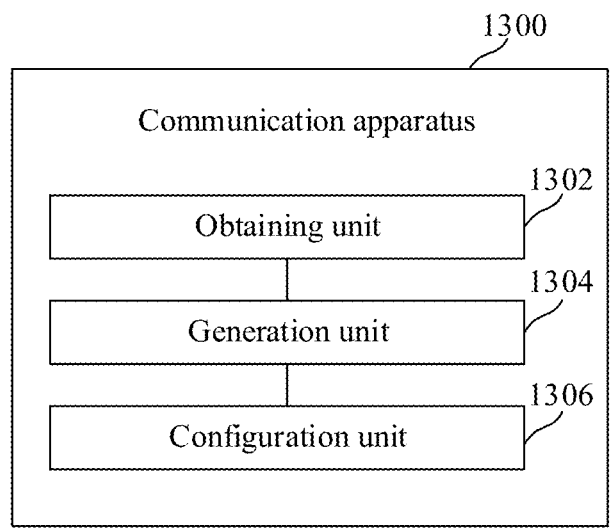
FIG. 13 is a block diagram of a communication apparatus according to an embodiment of this disclosure.

FIG. 13 is a block diagram of a communication apparatus according to an embodiment of this disclosure.

Referring to FIG. 13, a communication apparatus 1300 according to an embodiment of this disclosure includes: an obtaining unit 1302, a generation unit 1304, and a configuration unit 1306.

The obtaining unit 1302 is configured to obtain a total latency tolerance of UL transmission and DL transmission of a target service. The generation unit 1304 is configured to generate a transmission latency indication message for the target service according to the total latency tolerance, the transmission latency indication message including QoS flow indication information of the UL transmission of the target service and QoS flow indication information of the DL transmission of the target service. The configuration unit 1306 is configured to configure the transmission latency indication message for a RAN entity, so as to enable the RAN entity to monitor a transmission latency of the target service according to the transmission latency indication message.

In some embodiments of this disclosure, based on the foregoing solutions, the obtaining unit 1302 is configured to receive a notification message transmitted by an AF entity, and obtain the total latency tolerance according to the notification message; or obtain the total latency tolerance based on information of a contractual agreement with the AF entity; or obtain the total latency tolerance pre-configured by the AF entity.

In some embodiments of this disclosure, based on the foregoing solutions, the generation unit 1304 is configured to generate information for indicating the total latency tolerance according to the total latency tolerance, and allocate QoS flow indication information respectively to the UL transmission and the DL transmission of the target service; and generate the transmission latency indication message according to the information for indicating the total latency tolerance and the QoS flow indication information respectively allocated to the UL transmission and the DL transmission of the target service.

In some embodiments of this disclosure, based on the foregoing solutions, the generation unit 1304 is configured to determine an UL latency tolerance and a DL latency tolerance of the target service according to the total latency tolerance; and generate the QoS flow indication information of the UL transmission according to the UL latency tolerance, and generate the QoS flow indication information of the DL transmission according to the DL latency tolerance.

In some embodiments of this disclosure, based on the foregoing solutions, the generation unit 1304 is configured to divide the total latency tolerance to obtain the UL latency tolerance and the DL latency tolerance of the target service; or receive a division status, notified by an AF entity, of the UL latency tolerance and the DL latency tolerance of the target service, and determine the UL latency tolerance and the DL latency tolerance according to the division status and the total latency tolerance; or receive priorities, notified by the AF entity, of the UL transmission and the DL transmission of the target service, and determine the UL latency tolerance and the DL latency tolerance according to the priorities and the total latency tolerance.

In some embodiments of this disclosure, based on the foregoing solutions, the QoS flow indication information of the UL transmission of the target service includes: one piece of QoS flow indication information corresponding to all UL data of the target service; or Qos flow indication information respectively corresponding to different types of UL data of the target service, the different types of UL data being respectively corresponding to different QoS flow indication information.

In some embodiments of this disclosure, based on the foregoing solutions, the QoS flow indication information of the DL transmission of the target service includes: one piece of QoS flow indication information corresponding to all DL data of the target service; or QoS flow indication information respectively corresponding to different types of DL data of the target service, the different types of DL data being respectively corresponding to different QoS flow indication information.

In some embodiments of this disclosure, based on the foregoing solutions, when the communication method is performed by the CN entity, the obtaining unit 1302 is configured to: obtain the total latency tolerance from the AF entity by using a PCF entity; or obtain the total latency tolerance from the AF entity by using a NEF entity and forward the total latency tolerance to the PCF entity.

Figure 14:
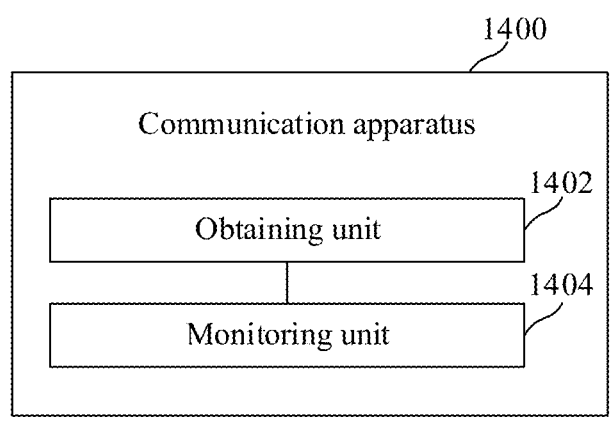
FIG. 14 is a block diagram of a communication apparatus according to an embodiment of this disclosure.

FIG. 14 is a block diagram of a communication apparatus according to an embodiment of this disclosure.

Referring to FIG. 14, a communication apparatus 1400 according to an embodiment of this disclosure includes: an obtaining unit 1402 and a monitoring unit 1404.

The obtaining unit 1402 is configured to obtain a transmission latency indication message configured by a CN entity for a target service, the transmission latency indication message being generated by the CN entity according to a total latency tolerance of UL transmission and DL transmission of the target service, and the transmission latency indication message including QoS flow indication information of the UL transmission of the target service and QoS flow indication information of the DL transmission of the target service. The monitoring unit 1404 is configured to monitor a transmission latency of the target service according to the transmission latency indication message.

In some embodiments of this disclosure, based on the foregoing solutions, the monitoring unit 1404 is configured to monitor a total latency of the UL transmission and the DL transmission of the target service according to the total latency tolerance when the transmission latency indication message further includes information for indicating the total latency tolerance; monitor an UL transmission latency of the target service according to an UL latency tolerance when the QoS flow indication information of the UL transmission includes the UL latency tolerance; and monitor a DL transmission latency of the target service according to a DL latency tolerance when the QoS flow indication information of the DL transmission includes the DL latency tolerance.

In some embodiments of this disclosure, based on the foregoing solutions, the QoS flow indication information of the UL transmission includes: QoS flow indication information respectively corresponding to different types of UL data of the target service, and the QoS flow indication information of the DL transmission includes QoS flow indication information respectively corresponding to different types of DL data of the target service; and the monitoring unit 1404 is configured to: monitor, according to the transmission latency indication message, a transmission latency of UL data of a specified type of the target service and a transmission latency of DL data of a specified type of the target service, the UL data of the specified type and the DL data of the specified type being located in the same PDU session or in different PDU sessions during transmission.

In some embodiments of this disclosure, based on the foregoing solutions, the target service includes a cloud gaming service; and the UL data of the specified type includes game manipulation data, and the DL data of the specified type includes multimedia data obtained by rendering a game scene.

In some embodiments of this disclosure, based on the foregoing solutions, the monitoring unit 1404 is configured to monitor a transmission latency of the target service between UE and the RAN entity according to the transmission latency indication message; and/or monitor a transmission latency of the target service between UE and a UPF entity according to the transmission latency indication message and latency information between the RAN entity and the UPF entity.

Figure 15:
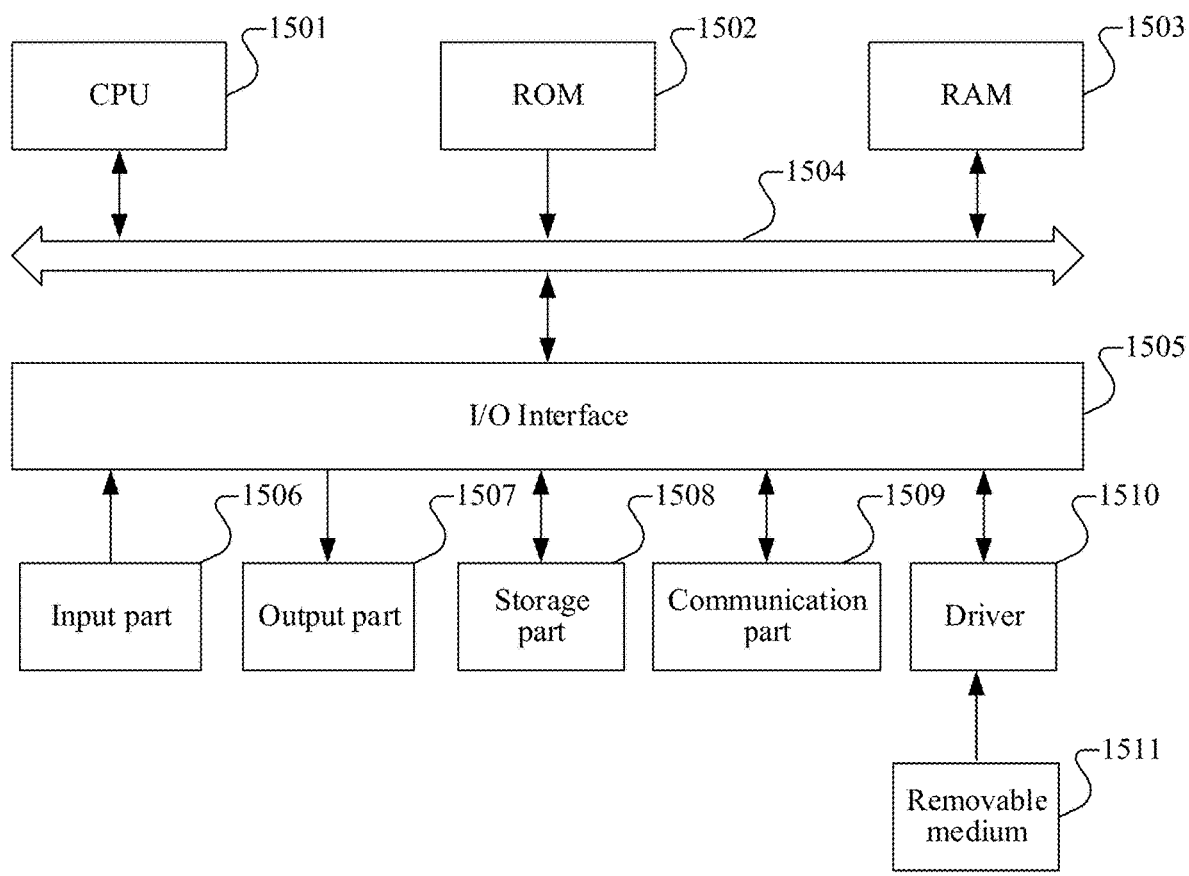
FIG. 15 is a schematic structural diagram of a computer system adapted to implement an electronic device according to an embodiment of this disclosure.

FIG. 15 is a schematic structural diagram of a computer system adapted to implement an electronic device according to an embodiment of this disclosure.

The computer system 1500 of the electronic device shown in FIG. 15 is merely an example, and does not constitute any limitation on functions and use ranges of the embodiments of this disclosure.

As shown in FIG. 15, the computer system 1500 includes a central processing unit (CPU) 1501, which may perform various suitable actions and processing based on a program stored in a read-only memory (ROM) 1502 or a program loaded from a storage part 1508 into a random access memory (RAM) 1503, for example, perform the method described in the foregoing embodiments. The RAM 1503 further stores various programs and data required for system operations. The CPU 1501, the ROM 1502, and the RAM 1503 are connected to each other through a bus 1504. An input/output (I/O) interface 1505 is also connected to the bus 1504.

The following components are connected to the I/O interface 1505: an input part 1506 including a keyboard, a mouse, or the like, an output part 1507 including a cathode ray tube (CRT), a liquid crystal display (LCD), a speaker, or the like, a storage part 1508 including a hard disk, or the like, and a communication part 1509 including a network interface card such as a local area network (LAN) card or a modem. The communication part 1509 performs communication processing via a network such as the Internet. A driver 1510 is also connected to the I/O interface 1505 as required. A removable medium 1511, such as a magnetic disk, an optical disc, a magneto-optical disk, or a semiconductor memory, is installed on the driver 1510 as required, so that a computer program read from the removable medium is installed into the storage part 1508 as required.

Particularly, according to an embodiment of this disclosure, the processes described in the following by referring to the flowcharts may be implemented as computer software programs. For example, this embodiment of this disclosure includes a computer program product, the computer program product includes a computer program carried on a computer-readable medium, and the computer program includes program code used for performing the methods shown in the flowcharts. In such an embodiment, the computer program may be downloaded and installed from a network through the communication part 1509, and/or installed from the removable medium 1511. When the computer program is executed by the CPU 1501, the various functions defined in the system of this disclosure are executed.

The computer-readable medium shown in the embodiments of this disclosure may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this disclosure, the computer-readable storage medium may be any tangible medium containing or storing a program, and the program may be used by or used in combination with an instruction execution system, an apparatus, or a device. In this disclosure, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer readable medium in addition to a computer-readable storage medium. The computer readable medium may send, propagate, or transmit a program that is used by or used in conjunction with an instruction execution system, an apparatus, or a device. The program code included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of this disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. In addition, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this disclosure may be implemented in a software manner, or may be implemented in a hardware manner, and the unit described can also be set in a processor. Names of the units do not constitute a limitation on the units in a specific case.

According to another aspect, this disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

According to another aspect, this disclosure further provides a computer program product including instructions, the instructions, when run on a server, causing the server to perform the method in the foregoing embodiments.

Although a plurality of modules or units of a device configured to perform actions are discussed in the foregoing detailed description, such division is not mandatory. Actually, according to the implementations of this disclosure, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the implementations of this disclosure may be implemented in a form of a software product. The software product may be stored in a non-volatile storage medium (which may be a CD-ROM, a USB flash drive, a removable hard disk, or the like) or on a network, and includes several instructions for instructing a computing device (which may be a personal computer, a server, a touch terminal, network device, or the like) to perform the methods according to the implementations of this disclosure.

After considering the specification and practicing the disclosed embodiments, a person skilled in the art may easily conceive of other implementations of this disclosure. This disclosure is intended to cover any variations, uses, or adaptive changes of this disclosure. These variations, uses, or adaptive changes follow the general principles of this disclosure and include common general knowledge or common technical means in the art, which are not disclosed in this disclosure.

It is to be understood that this disclosure is not limited to the precise structures described above and shown in the accompanying drawings, and various modifications and changes can be made without departing from the scope of this disclosure. The scope of this disclosure is subject only to the appended claims.

What is claimed is:

1. A communication method, comprising:
receiving a notification message transmitted by an application function (AF) entity to obtain a total latency tolerance of uplink (UL) transmission and downlink (DL) transmission of a target service and a dynamic division of the UL transmission and DL transmission;
generating a transmission latency indication message for the target service according to the total latency tolerance and the dynamic division of the UL transmission and DL transmission, the transmission latency indication message comprising quality of service (QOS) flow indication information of the UL transmission of the target service corresponding to an UL latency tolerance and QoS flow indication information of the DL transmission of the target service corresponding to a DL latency tolerance, the UL latency tolerance and the DL latency tolerance being determined according to the total latency tolerance and the dynamic division of the UL transmission and DL transmission; and
providing the transmission latency indication message to a radio access network (RAN) entity to have the RAN entity configured to monitor a transmission latency of the target service according to the transmission latency indication message.

2. The communication method according to claim 1, wherein generating the transmission latency indication message for the target service according to the total latency tolerance comprises:
generating the transmission latency indication message comprising the QoS flow indication information of the UL transmission of the target service, the QoS flow indication information of the UL transmission of the target service comprising one piece of QoS flow indication information corresponding to all UL data of the target service.

3. The communication method according to claim 1, wherein generating the transmission latency indication message for the target service according to the total latency tolerance comprises:
generating information for indicating the total latency tolerance according to the total latency tolerance;
allocating QoS flow indication information respectively to the UL transmission and the DL transmission of the target service; and
generating the transmission latency indication message according to the information for indicating the total latency tolerance and the QoS flow indication information respectively allocated to the UL transmission and the DL transmission of the target service.

4. The communication method according to claim 1, wherein
generating the transmission latency indication message for the target service according to the total latency tolerance further comprises:
generating the QoS flow indication information of the UL transmission according to the UL latency tolerance; and
generating the QoS flow indication information of the DL transmission according to the DL latency tolerance.

5. The communication method according to claim 1, wherein generating the transmission latency indication message for the target service according to the total latency tolerance comprises:
generating the transmission latency indication message comprising the QoS flow indication information of the UL transmission of the target service, the QoS flow indication information of the UL transmission of the target service comprising:
at least two pieces of QoS flow indication information respectively corresponding to different types of UL data of the target service.

6. The communication method according to claim 1, wherein generating the transmission latency indication message for the target service according to the total latency tolerance comprises:
generating the transmission latency indication message comprising the QoS flow indication information of the DL transmission of the target service, the QoS flow indication information of the DL transmission of the target service comprising at least one of:
at least two pieces of QoS flow indication information respectively corresponding to different types of DL data of the target service.

7. The communication method according to claim 1, wherein obtaining the total latency tolerance of UL transmission and DL transmission of the target service comprises at least one of:
obtaining, by a policy control function (PCF) entity, the total latency tolerance from the AF entity; or
obtaining, by a network exposure function (NEF) entity, the total latency tolerance from the AF entity and forwarding the total latency tolerance to the PCF entity.

8. The communication method according to claim 1, further comprising:
monitoring the transmission latency of the target service according to the transmission latency indication message by the RAN entity.

9. The communication method according to claim 8, wherein monitoring the transmission latency of the target service according to the transmission latency indication message comprises at least one of:
monitoring a total latency of the UL transmission and the DL transmission of the target service according to the total latency tolerance when the transmission latency indication message further comprises information for indicating the total latency tolerance;
monitoring an UL transmission latency of the target service according to the UL latency tolerance when the QoS flow indication information of the UL transmission comprises the UL latency tolerance; or
monitoring a DL transmission latency of the target service according to the DL latency tolerance when the QoS flow indication information of the DL transmission comprises the DL latency tolerance.

10. A communication method, applicable to a radio access network (RAN) entity, the method comprising:
obtaining a transmission latency indication message generated by a core network (CN) entity for a target service according to a total latency tolerance of uplink (UL) transmission and downlink (DL) transmission of the target service and a dynamic division of the UL transmission and DL transmission received from an application function (AF) entity, the transmission latency indication message comprising quality of service (QOS) flow indication information of the UL transmission of the target service corresponding to an UL latency tolerance and QoS flow indication information of the DL transmission of the target service corresponding to a DL latency tolerance, the UL latency tolerance and the DL latency tolerance being determined according to the total latency tolerance and the dynamic division of the UL transmission and DL transmission; and monitoring a transmission latency of the target service according to the transmission latency indication message.

11. The communication method according to claim 10, wherein monitoring the transmission latency of the target service according to the transmission latency indication message comprises at least one of:

monitoring a total latency of the UL transmission and the DL transmission of the target service according to the total latency tolerance when the transmission latency indication message further comprises information for indicating the total latency tolerance;

monitoring an UL transmission latency of the target service according to the UL latency tolerance when the QoS flow indication information of the UL transmission comprises the UL latency tolerance; or monitoring a DL transmission latency of the target service according to the DL latency tolerance when the QoS flow indication information of the DL transmission comprises the DL latency tolerance.

12. The communication method according to claim 10, wherein the QoS flow indication information of the UL transmission comprises QoS flow indication information respectively corresponding to different types of UL data of the target service, and the QoS flow indication information of the DL transmission comprises QoS flow indication information respectively corresponding to different types of DL data of the target service; and wherein monitoring the transmission latency of the target service according to the transmission latency indication message comprises:

monitoring, according to the transmission latency indication message, a transmission latency of first type UL data of the target service and a transmission latency of second type DL data of the target service.

13. The communication method according to claim 12, wherein monitoring, according to the transmission latency indication message, the transmission latency of the first type UL data of the target service and the transmission latency of the second type DL data of the target service comprises:

monitoring, according to the transmission latency indication message, the transmission latency of the first type UL data of game manipulation data of a cloud gaming service and the transmission latency of the second type DL of multimedia data obtained by rendering a game scene of the cloud gaming service.

14. The communication method according to claim 10, wherein monitoring the transmission latency of the target service according to the transmission latency indication message comprises at least one of:

monitoring a transmission latency of the target service between user equipment (UE) and the RAN entity according to the transmission latency indication message; or monitoring a transmission latency of the target service between UE and a user plane function (UPF) entity according to the transmission latency indication message and latency information between the RAN entity and the UPF entity.

15. A core network entity, comprising:

a receiver, configured to receive a notification message transmitted by an application function (AF) entity to obtain a total latency tolerance of uplink (UL) transmission and downlink (DL) transmission of a target service and a dynamic division of the UL transmission and DL transmission;

a processor in communication with the receiver, configured to generate a transmission latency indication message for the target service according to the total latency tolerance and the dynamic division of the UL transmission and DL transmission, the transmission latency indication message comprising quality of service (QOS) flow indication information of the UL transmission of the target service corresponding to an UL latency tolerance and QoS flow indication information of the DL transmission of the target service corresponding to a DL latency tolerance, the UL latency tolerance and the DL latency tolerance being determined according to the total latency tolerance and the dynamic division of the UL transmission and DL transmission; and a transmitter in communication with a radio access network (RAN) entity, configured to provide the transmission latency indication message to the RAN entity, so as to have the RAN entity configured to monitor a transmission latency of the target service according to the transmission latency indication message.

16. The core network entity according to claim 15, wherein the receiver is configured to obtain the total latency tolerance of the UL transmission and the DL transmission of the target service by at least one of:

obtaining, by a policy control function (PCF) entity, the total latency tolerance from the AF entity; or obtaining, by a network exposure function (NEF) entity, the total latency tolerance from the AF entity and forwarding the total latency tolerance to the PCF entity.

17. The core network entity according to claim 15, wherein the processor is configured to generate the transmission latency indication message for the target service according to the total latency tolerance by:

generating information for indicating the total latency tolerance according to the total latency tolerance;

allocating QoS flow indication information respectively to the UL transmission and the DL transmission of the target service; and generating the transmission latency indication message according to the information for indicating the total latency tolerance and the QoS flow indication information respectively allocated to the UL transmission and the DL transmission of the target service.

18. The core network entity according to claim 15, wherein the processor is configured to generate the transmission latency indication message for the target service according to the total latency tolerance by:

generating the QoS flow indication information of the UL transmission according to the UL latency tolerance; and generating the QoS flow indication information of the DL transmission according to the DL latency tolerance.

19. The core network entity according to claim 15, wherein the processor is configured to generate the transmission latency indication message for the target service according to the total latency tolerance by:
    generating the transmission latency indication message comprising the QoS flow indication information of the UL transmission of the target service, the QoS flow indication information of the UL transmission of the target service comprising at least one of:
        one piece of QoS flow indication information corresponding to all UL data of the target service; or
        at least two pieces of QoS flow indication information respectively corresponding to different types of UL data of the target service.

* * * * *